Oct. 31, 1950     E. W. HORN     2,528,144
CULTIVATOR ATTACHMENT FOR FARM TRACTORS
Filed Feb. 1, 1949     2 Sheets-Sheet 1
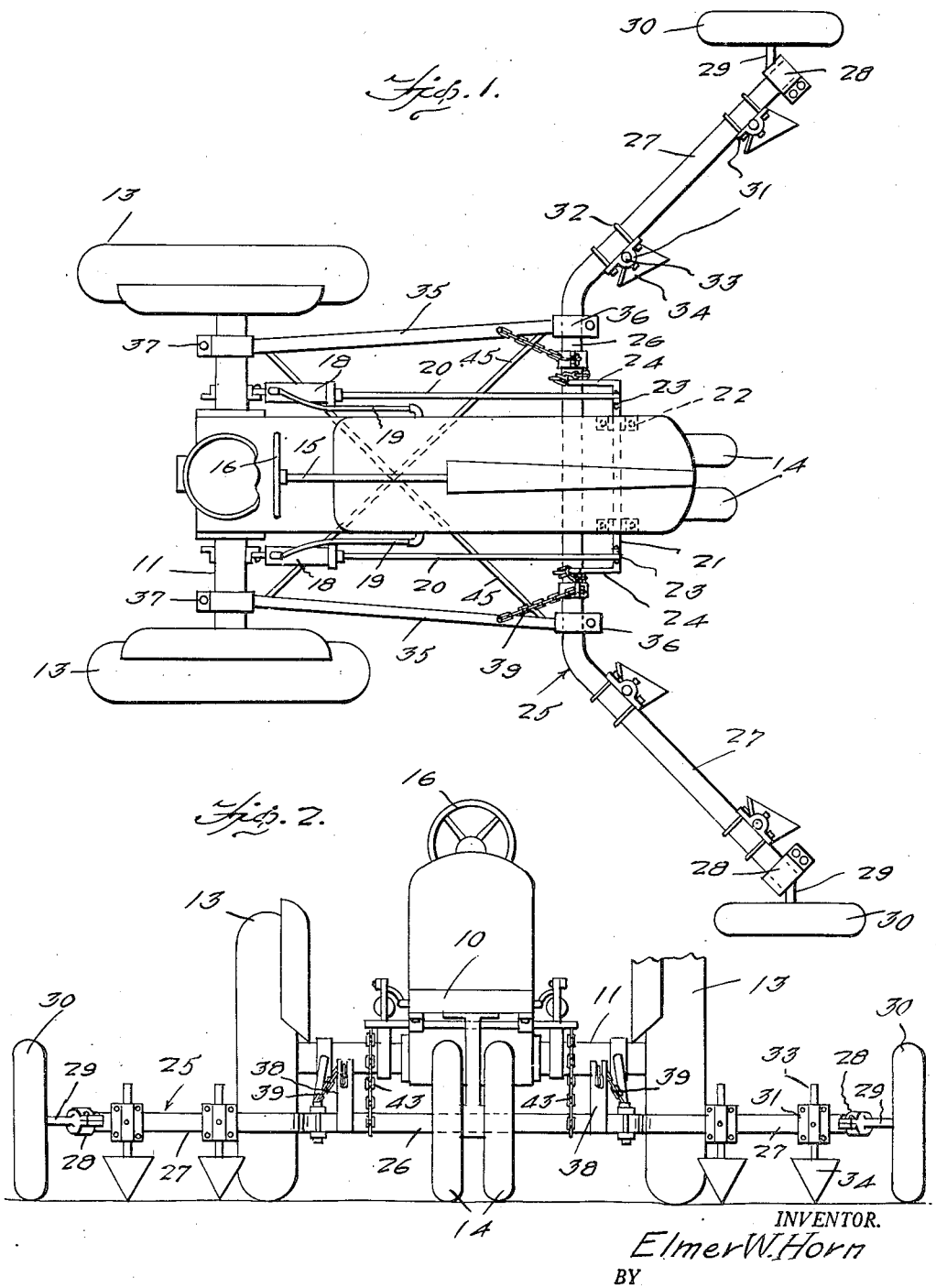
INVENTOR.
Elmer W. Horn
BY
McMorrow, Berman + Davidson
ATTORNEYS

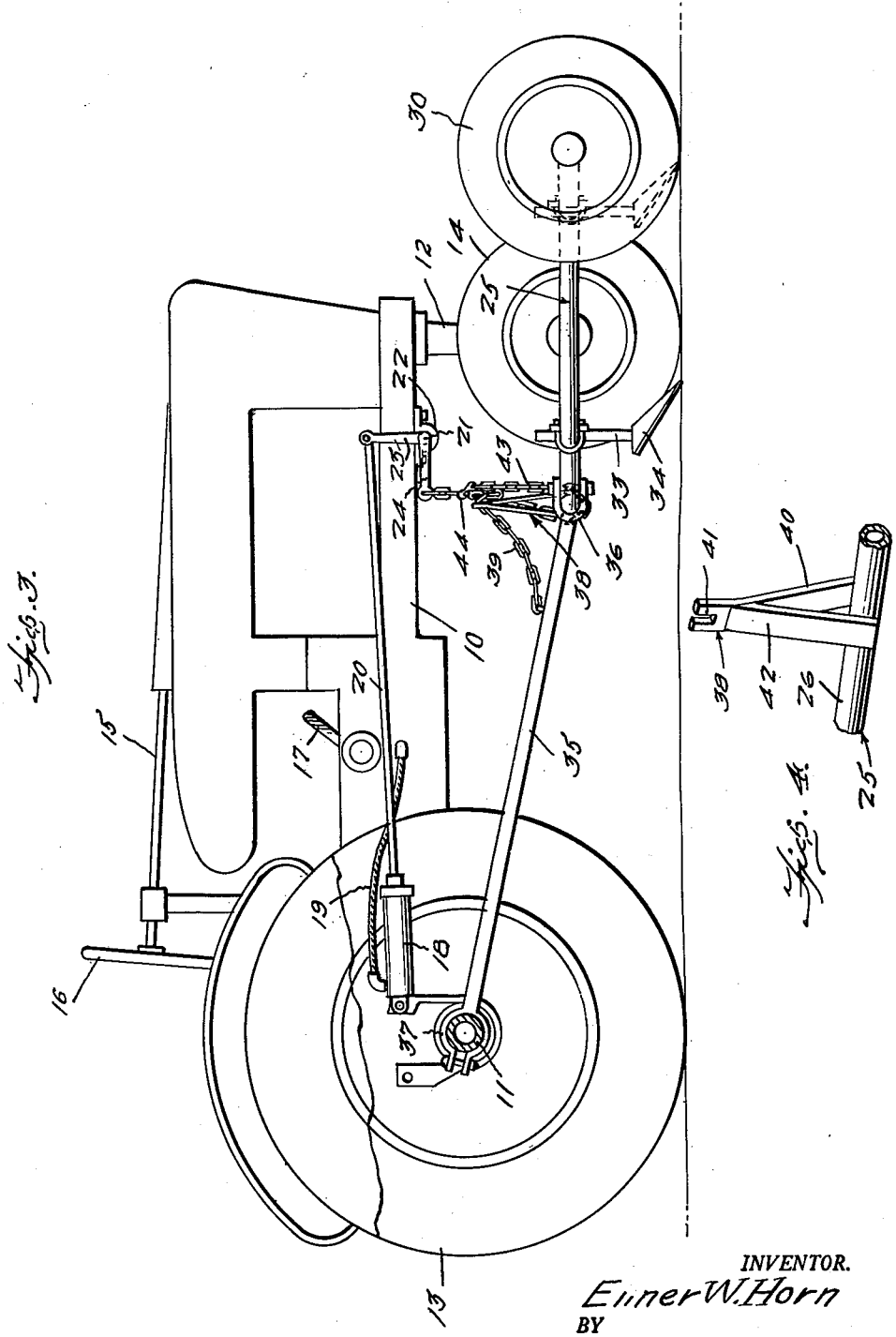

Patented Oct. 31, 1950

2,528,144

UNITED STATES PATENT OFFICE 2,528,144

CULTIVATOR ATTACHMENT FOR FARM TRACTORS

Elmer W. Horn, Forest, Ohio

Application February 1, 1949, Serial No. 73,987

2 Claims. (Cl. 97—47)

This invention relates to cultivator attachments for farm tractors, and more particularly to a row crop cultivator which extends laterally and forwardly of the tractor to cultivate the land at the opposite sides of the tractor.

It is among the objects of the invention to provide an improved tractor cultivator attachment which is disposed mainly forwardly and laterally of the tractor to widen the strip worked by the tractor in each pass over the land, and is pivotally connected to the tractor and supported at its front end on independent wheels, so that it will accurately follow the contour of the land over which the tractor passes, which is extremely simple and durable in construction, economical to manufacture, and is attachable to the tractor and the power-operated lift mechanism of the tractor in a manner such that it can be lifted entirely clear of the ground by the implement lift equipment of the tractor.

Other objects and advantages will become apparent from a consideration of the following description and the appended claims in conjunction with the accompanying drawings, wherein:

Figure 1 is a top plan view of a farm tractor equipped with a cultivating attachment illustrative of the invention;

Figure 2 is a front elevation of the tractor and cultivating attachment illustrated in Figure 1;

Figure 3 is a side elevation of the tractor and cultivating attachment illustrated in Figures 1 and 2; and Figure 4 is a perspective view of a fragmentary portion of the cultivator attachment illustrating a structural detail.

With continued reference to the drawings, there is illustrated a conventional farm tractor having a frame 10 supported at its rear end on the tractor rear axle 11 and at its front end on a front wheel column 12, a pair of rear wheels 13 journaled on respectively opposite ends of the rear axle 11, and a pair of front wheels 14 journaled on an axle carried by the column 12 at the bottom end of the latter. The frame 10 carries the tractor engine, transmission and differential mechanism, and a steering shaft 15 is carried above the engine and operatively connected with the front wheel axle to steer the tractor, in a manner well known to the art. A steering wheel 16 is secured on the rear end of the steering shaft 15 and adjacent the steering wheel 16 are provided the usual seat and control levers for controlling operation of the tractor. A suitable hydraulic pump is disposed within the tractor frame and drivingly connected with the engine and includes a valve controlled by a suitable manually-operated lever 17. Hydraulic cylinders or expansible chamber devices 18 are disposed at respectively opposite sides of the tractor frame 10 and pivotally connected at their rear ends to the rear axle 11. Flexible conduits 19 connect the cylinders 18 with the pump valve, and piston rods 20 extend forwardly from the respective cylinders. A shaft 21 extends transversely of the under side of the tractor frame 10 immediately to the rear of the front wheel column 12, and is rotatably secured to the tractor frame by suitable bearing caps 22 and this shaft has secured on each end thereof a respective right-angle bell crank, each having a substantially vertical arm 23 and a substantially horizontal arm 24. The front ends of the piston rods 20 are pivotally connected to the upper ends of respective vertical bell crank arms 23, so that the rearward ends of the corresponding horizontal arms 24 can be raised and lowered by controlling the application of hydraulic fluid under pressure to the cylinders 18 by means of the manual control lever 17.

Except for the modified implement lift equipment, above described in detail, the tractor is of entirely conventional construction, and a more detailed description thereof is not considered necessary for the purposes of the present disclosure.

The cultivator attachment of the present invention includes an elongated, generally U-shaped tool bar, generally indicated at 25. The tool bar 25 may be satisfactorily provided as a continuous length of steel tubing of proper diameter, a diameter of approximately three inches having been found to give highly satisfactory results in service, and comprises three portions of substantially equal length, including a straight center portion 26, and two end portions 27 extending from respective ends of the center portion and disposed at an angle of substantially 45 degrees to the center portion. In applying the attachment to the tractor, the center portion 26 of the tool bar is disposed beneath the front portion of the tractor adjacent the rear sides of the front wheels 14, and extends transversely to the longitudinal center-line of the tractor in substantially symmetrical relationship to such center-line. The end portions 27 extend outwardly and forwardly, relative to the tractor, from the center portion 26. A respective splint or socket 28 is secured on the outer end of each tool bar end portion 27, and a respective axle 29 projects outwardly from each socket 28. Respective wheels 30 are journaled on the axles 29 to support the front end of the cultivator attachment. These wheels 30 are preferably rubber-tired wheels, such as are conventionally used at the present time for supporting agricultural implements and, if desired, the axles 29 may be connected to the splints 28 in a manner to provide a caster effect for these attachment-supporting wheels.

Tool clamps 31 in the form of semi-cylindrical brackets are secured in spaced-apart relationship to the two end portions 27 of the tool bar by respective pairs of U-bolts 32, and respective tool shanks 33 are secured to the tool bar by these clamps. The tool shanks 33 depend from the end portions of the tool bar and carry cultivating blades 34 of desired shape at their bottom ends.

A pair of links 35 is disposed at respectively opposite sides of the tractor frame 10 and spaced from the latter, and are pivotally connected at their front ends to the intermediate portion 26 of the tool bar 27 near respective ends of such intermediate portion by respective split ring clamps 36. The rear ends of these links 35 are pivotally connected to the tractor rear axle near corresponding rear wheels 13 by respective split ring clamps 37 surrounding the rear axle. These links transmit the propulsive effort of the tractor to the tool bar 25.

Crossed-over brace rods 45 extend diagonally from the front end of each link to the rear end of the opposite link to give lateral rigidity to the link assembly.

Respective arms, generally indicated at 38, are secured at their bottom ends to the intermediate portion 26 of the tool bar 25 respectively adjacent the front ends of the links 35, and respective chains 39 are connected, each at one end, to a respective link 35 at a location spaced rearwardly from the tool bar 25, and are engaged with the upper ends of the respective arms 38 to limit pivotal movement between the tool bar 25 and the links 35.

The two arms 38 are identical in construction, and one of them is illustrated in detail in Figure 4. This arm comprises a flat lever 40 secured at its lower end to the forward side of the intermediate portion of the tool bar 25, and projecting upwardly from the tool bar substantially at right angles to the latter. This lever 40 is provided in its upper end with a chain-receiving notch 41, so that the chain can be adjustably connected to the lever, and a flat brace 42 is connected at its upper end to the lever 40 immediately below the notch 41, and is secured at its bottom end to the side of the tool bar 25 opposite the side to which the bottom end of the lever 40 is connected.

Respective chains 43 are connected each at one end to the outer ends of the substantially horizontal legs 24 of the bell crank members of the implement lift equipment, and are provided at their opposite ends with hooks 44. These chains are carried downwardly from the horizontal arms of the bell crank members, and around the intermediate portion 26 of the tool bar 25 and then upwardly, and the hooks 44 are engaged with the depending portions of the respective chains to adjustably connect the bell crank levers of the lift equipment to the tool bar of the cultivator attachment. With this arrangement, when the outer ends of the legs 24 of the bell crank members are raised by force applied by the hydraulic cylinders 18 through the piston rods 20 and vertical legs 23, the tool bar will be raised. Since the chains 39 limit the pivotal movement between the tool bar and the links 35, the front wheels 30 and the tools will be simultaneously raised and brought entirely clear of the ground, so that the tractor may be turned and otherwise maneuvered, as may be necessary, with the tools out of engagement with the ground. When the attachment is lowered, and with the chains 39 properly adjusted, the wheels 30 may follow the contour of the ground ahead of the tractor front wheels 14, and will maintain the tools at a substantially constant operating depth in the ground at all times.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cultivator attachment for a farm tractor comprising a generally U-shaped tool bar having a straight center portion disposable below the front portion of a tractor to extend transversely of the latter, and respective straight end portions extending from the opposite ends of said center portion to extend outwardly and forwardly of the tractor at an angle of approximately 45 degrees to said center portion, respective wheels journaled on said tool bar at the outer ends of said end portions, a pair of spaced-apart links pivotally connected at corresponding ends to said tool bar center portion near respectively opposite ends of the latter and attachable at their opposite ends to a tractor rear axle, respective arms extending upwardly from said tool bar center portion near each of said links, adjustable means connecting said arms to said links to limit pivotal movement between said bar and said links, and adjustable means connected to said tool bar for connecting said tool bar to tractor implement lift equipment for lifting said cultivator attachment.

2. A cultivator attachment for a farm tractor comprising an elongated tool bar having a straight center portion and straight end portions extending outwardly from respective ends of said center portion and disposed at an acute angle to the latter, wheels journaled on said tool bar at respective outer ends of said end portions, means pivotally connected to said tool bar for supporting the latter from a tractor rear axle in position in which said tool bar center portion extends transversely below the tractor front portions substantially symmetrical to the tractor longitudinal center-line, adjustable means limiting pivotal movement between said tool bar and said tool bar supporting means, and means connected to said tool bar for operatively connecting the latter to tractor implement lift equipment, and said adjustable means limiting pivotal movement between said tool bar and said tool bar supporting means comprising respective arms secured at corresponding ends to said tool bar center portion near opposite ends of the latter and having chain-receiving notches in their outer ends, and respective chains secured at corresponding ends to said links at locations spaced from said tool bar and adjustably engageable in the chain-receiving notches in said arms.

ELMER W. HORN.

REFERENCES CITED

The following references are of record in the file of this patent:

UNITED STATES PATENTS

| Number | Name | Date |
|---|---|---|
| 1,946,402 | Johnson | Feb. 6, 1934 |
| 2,446,136 | Jarmin | July 27, 1948 |
| 2,469,605 | McKay | May 10, 1949 |